UNITED STATES PATENT OFFICE.

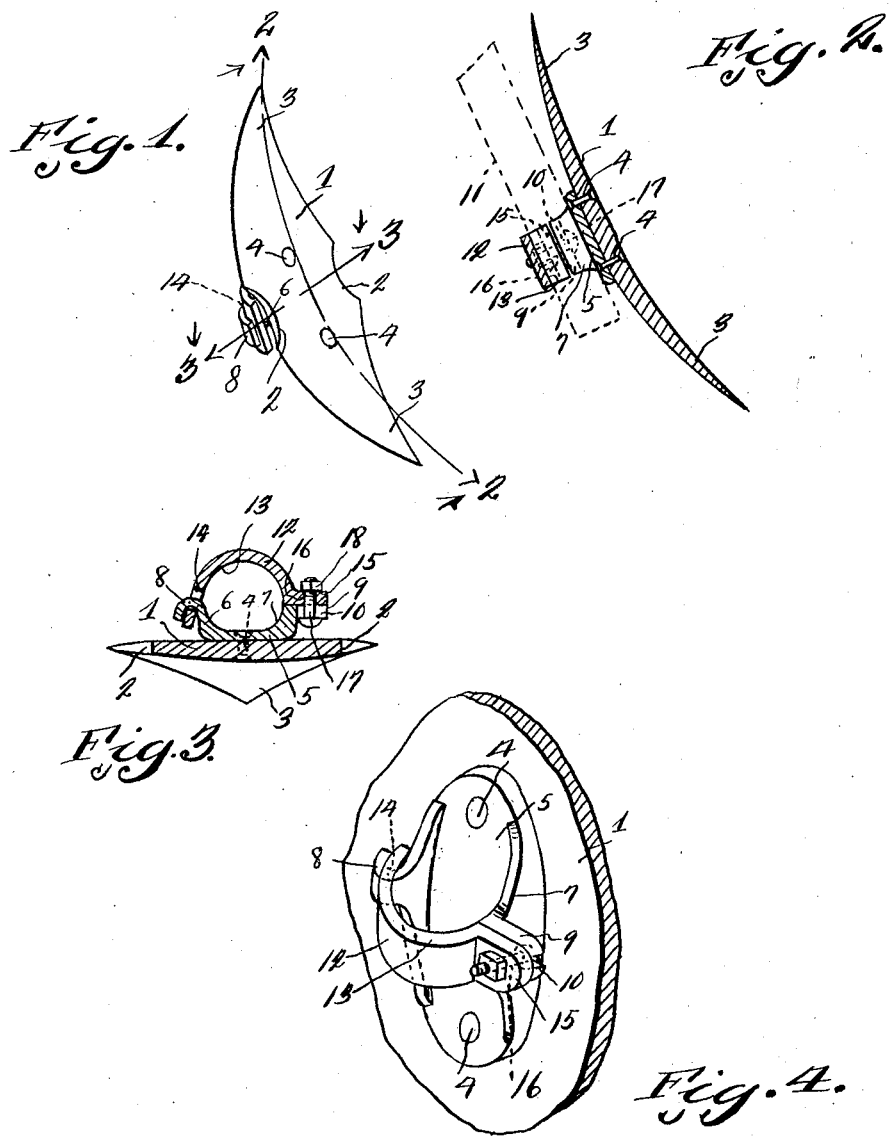

CLARENCE H. INGHAM AND WILLIAM H. WILCOX, OF COOPER, IOWA.

REVERSIBLE PLOW-SHOVEL.

1,340,392.

Specification of Letters Patent.

Patented May 18, 1920.

Application filed October 4, 1918. Serial No. 256,856.

*To all whom it may concern:*

Be it known that we, CLARENCE H. INGHAM and WILLIAM H. WILCOX, citizens of the United States, residing at Cooper, in the county of Greene, State of Iowa, have invented a new and useful Reversible Plow-Shovel; and we do hereby declare the following to be a full, clear, and exact description of the invention, such as will enable others skilled in the art to which it appertains to make and use the same.

This invention relates to an improved reversible shovel blade, and one of the objects of the invention is to provide an improved device of this kind, which may be manufactured for a small cost and sold at a reasonable profit.

A further object of the invention is to provide a shovel blade, which may be reversed so that either end of the blade may be employed.

A further object of the invention is to provide quickly releasable clamping means for attaching the shovel blade detachably to a plow standard.

A further object of the invention is to provide a quick releasable clamping means, which comprises a pair of members, one riveted or otherwise secured to the shovel plow, and provided with opposing flanges, one having a hook and the other a slotted ear, and the other member being in the form of an arch having an eye at one end engaging the hook and an ear at its opposite end, in combination with means for connecting the two ears.

In practical fields the details of construction may necessitate alterations falling within the scope of what is claimed.

The invention comprises further features and combination of parts as hereinafter set forth shown in the drawings and claimed.

In the drawings:—

Figure 1 is a perspective view of the improved shovel blade constructed in accordance with the invention.

Fig. 2 is a vertical sectional view on line 2—2 of Fig. 1.

Fig. 3 is a transverse sectional view on line 3—3 of Fig. 1.

Fig. 4 is a perspective view of a portion of the shovel plow showing its rear face, and illustrating the quick releasable attaching means as applied.

Referring more especially to the drawings, 1 designates the shovel blade as a whole, and which comprises a body, which is curved longitudinally and vertically, as shown and is tapered in cross section from the center to its upper and lower end, and also has its opposite end portions V-shaped as shown in Fig. 1. The shovel blade is tapered from its center transversely toward the opposite side edges, as shown in Fig. 3, and which side edges are provided with cutaway curved portions 2, which cutaway curved portions may be engaged by the hands, when removing and applying the shovel plow, or when adjusting the same on the plow standard. Either V-shaped end 3 of the shovel plow may be employed when applied to the standard. Secured by any suitable fastening means preferably rivets 4 to the rear face of the shovel plow is an elongated elliptical plate 5, and extending rearwardly from the longitudinal edge portions of said plate are elongated flanges 6 and 7 which are tapered as shown. The flange 6 terminates in an overturned hook 8, the extremity of which extends toward the rear face of the shovel blade. The flange 7 terminates in a laterally extending ear 9, which is provided with a longitudinally extending slot 10. The inner surface of the plate 5 is curved, so as to substantially conform to the cylindrical curvature of the plow standard 11 which is shown in dotted lines in Fig. 2. A clamping plate 12 is provided, and its semi-circular arch 13 arches the plow standard 11, as shown in Fig. 2, and one end of the clamping plate has an elongated slot 14, for the reception of the hook 8. The other end of the clamping plate 12 has a laterally extending ear 15, the opening 16 of which receives a bolt 17, which also engages the slot 10, and is provided with a threaded nut to clamp the ears 9 and 15 together, so as to draw the clamping plate 12 securely against the standard 11. The clamping plate 12 is quickly releasable, by simply removing the nut 18, or loosening the same, to permit adjustment of the plates 5 and 12 on the standard, or allow them to be removed by moving the shovel plow downwardly. It is obvious that by virtue of the flanges 6 and 7, a lateral twisting action of the shovel plow is prevented.

The invention having been set forth what is claimed as new and useful is:—

The combination with a plow standard, of a plow blade member, means carried by said member for quickly clamping on or removing the plow blade member onto or from the standard, said means comprising an elongated elliptical plate secured to the rear face of the shovel blade, the rear face of the plate being flat, the longitudinal curved edges of said plate having elongated tapering flanges engaging on each side of the standard, the flattened rear face of the elliptical plate engaging the flattened forward surface of the standard thereby preventing twisting of the shovel blade when in place, one of said flanges terminating in a hook extending toward the rear face of the plow blade, the other flange terminating in an ear opposite the hook, a semi-circular arching metallic strap having an eye at one end engaging said hook and arching the standard transversely, the other end of said strap having an ear, the first ear having an elongated slot, and means passing through the slot and the ear of the strap to secure the two ears together.

In testimony whereof we have signed our names to this specification in the presence of two subscribing witnesses.

CLARENCE H. INGHAM.
WILLIAM H. WILCOX.

Witnesses.
JOHN A. LINDER,
L. W. GRISWOLD.